(12) United States Patent
Drescher

(10) Patent No.: US 7,025,385 B2
(45) Date of Patent: Apr. 11, 2006

(54) COUPLING

(75) Inventor: Joseph D. Drescher, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 67 days.

(21) Appl. No.: 10/653,797

(22) Filed: Sep. 3, 2003

(65) Prior Publication Data

US 2005/0046186 A1 Mar. 3, 2005

(51) Int. Cl.
*F16L 21/00* (2006.01)

(52) U.S. Cl. .......................... 285/91; 285/360; 285/376; 285/401; 285/330

(58) Field of Classification Search .................. 285/91, 285/360, 376, 401, 330, 361, 402
See application file for complete search history.

(56) References Cited

U.S. PATENT DOCUMENTS

| 1,128,634 | A | * | 2/1915 | Talbot | 285/91 |
|---|---|---|---|---|---|
| 1,362,521 | A | * | 12/1920 | Zadora | 285/85 |
| 2,165,163 | A | * | 7/1939 | Waters | 285/91 |
| 3,253,842 | A | * | 5/1966 | Rabe | 285/81 |
| 3,860,209 | A | | 1/1975 | Strecker | |
| 3,948,545 | A | * | 4/1976 | Bonds | 285/4 |
| 4,176,815 | A | | 12/1979 | Davidson et al. | |
| 4,257,394 | A | | 3/1981 | Zabel | |
| 4,434,903 | A | * | 3/1984 | Cooke | 215/222 |
| 4,529,330 | A | * | 7/1985 | Boski | 403/2 |
| 4,552,509 | A | | 11/1985 | Schweikl et al. | |
| 4,630,994 | A | | 12/1986 | Gross | |
| 4,669,959 | A | | 6/1987 | Kalogeros | |
| 4,756,638 | A | | 7/1988 | Neyret | |
| 4,993,606 | A | | 2/1991 | Bolen, Jr. et al. | |
| 5,133,617 | A | | 7/1992 | Sokn et al. | |
| 5,188,399 | A | * | 2/1993 | Durina | 285/91 |
| 5,232,340 | A | | 8/1993 | Morgan | |
| 5,320,233 | A | | 6/1994 | Welch | |

(Continued)

*Primary Examiner*—James M. Hewitt
(74) *Attorney, Agent, or Firm*—Carlson, Gaskey & Olds

(57) ABSTRACT

A coupling connects a first member and a second member. The first member has a first interlocking member extending radially outward from an outer circumferential surface of an axial end. The second member includes a second interlocking member extending radially inward from an inner circumferential surface of an axial end. The axial end of the first member is inserted into the axial end of the second member, such that the first interlocking member is inserted past the second interlocking member. The first and second members are then rotated relative to one another to a locked angular orientation, in which the first interlocking member is interlocked with the second interlocking member to prevent relative axial movement of the first and second members. A key is then inserted into a keyway in the first and second members to lock the angular orientation, thereby coupling the first and second members to one another.

16 Claims, 5 Drawing Sheets

U.S. PATENT DOCUMENTS

| | | |
|---|---|---|
| 5,320,488 A | 6/1994 | Meade et al. |
| 5,332,358 A | 7/1994 | Hemmelgarn et al. |
| 5,338,154 A | 8/1994 | Meade et al. |
| 5,421,053 A | 6/1995 | Chodak |
| 5,494,174 A | 2/1996 | Rohr et al. |
| 5,626,435 A | 5/1997 | Wohlhuter |
| 5,667,251 A * | 9/1997 | Prest .......................... 285/12 |
| 5,704,659 A * | 1/1998 | Lunder ....................... 285/361 |
| 5,779,283 A | 7/1998 | Kimura et al. |
| 5,857,713 A * | 1/1999 | Horimoto .................... 285/81 |
| 5,975,116 A * | 11/1999 | Rosas et al. ........... 137/315.11 |
| 6,139,264 A | 10/2000 | Schilling |
| 6,402,798 B1 | 6/2002 | Kallsen et al. |
| 2003/0184091 A1* | 10/2003 | Ricard ....................... 285/358 |

* cited by examiner

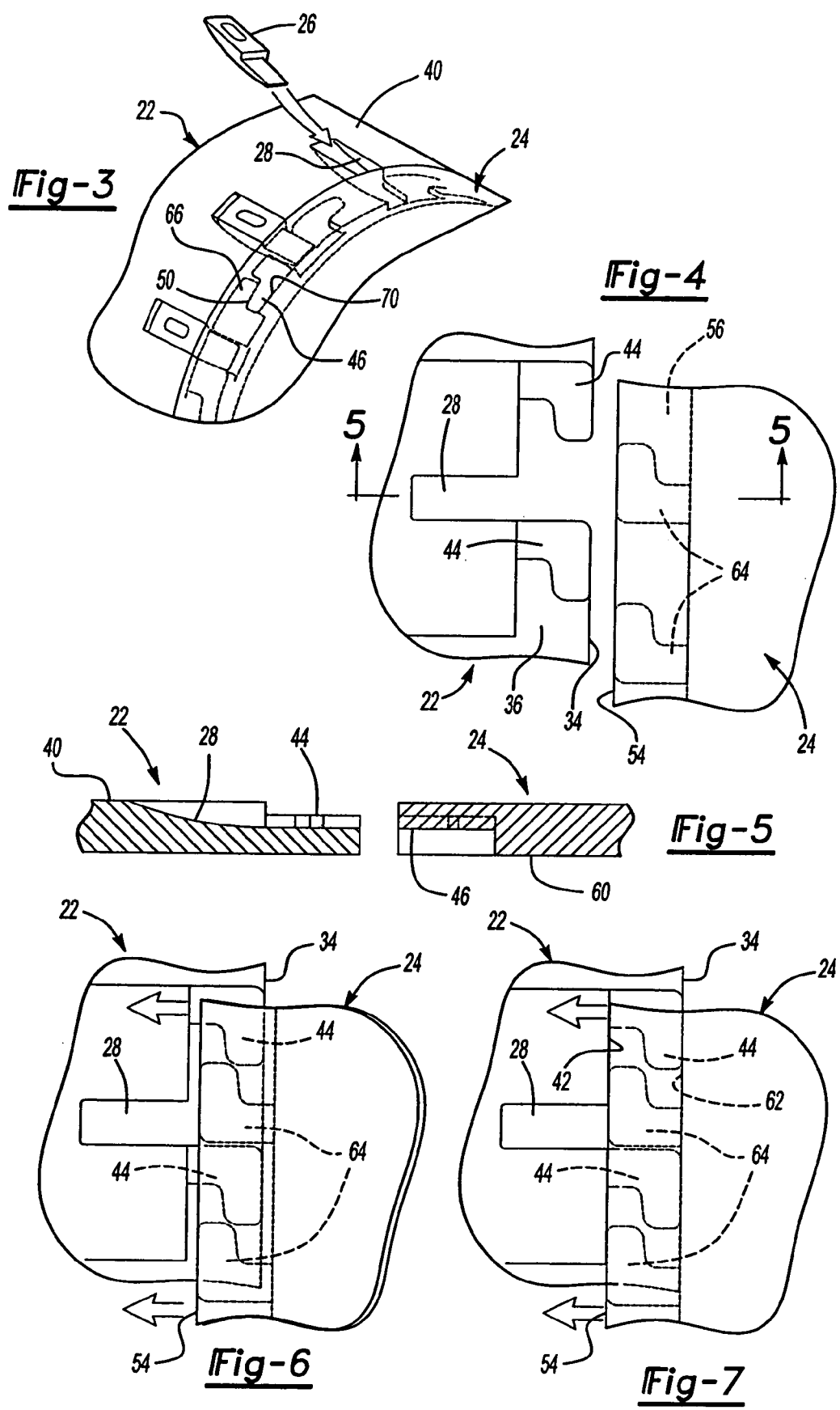

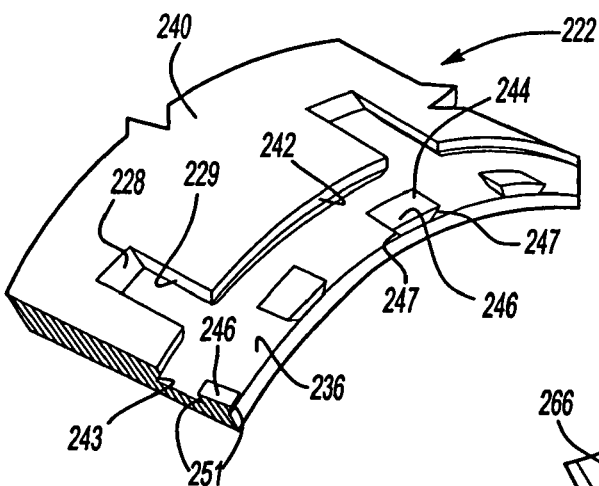
*Fig-12A*
*Fig-12B*
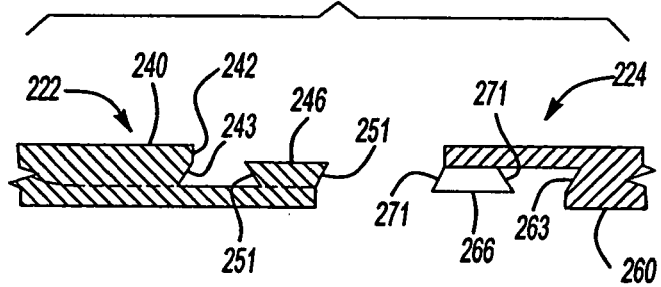
*Fig-12C*
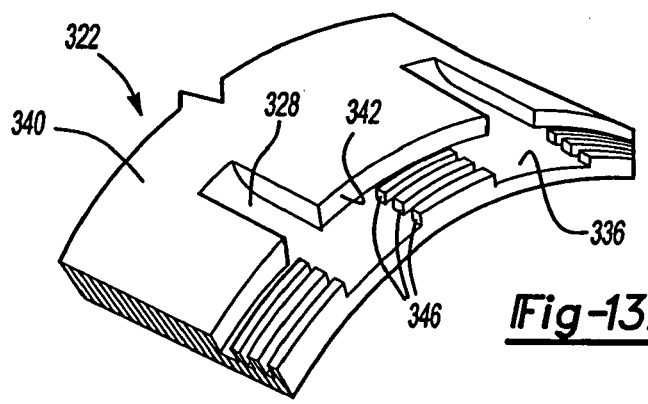
*Fig-13A*
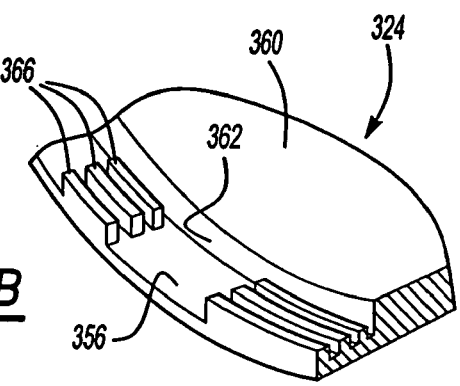
*Fig-13B*

COUPLING

BACKGROUND OF THE INVENTION

The present invention relates generally to a coupling and more particularly to a coupling for aligning and attaching structural members having circular cross-sections. Typically, a connection between two structural members having circular cross-sections (e.g. cylindrical or conical) is made by connecting an annular flange on one axial end of a first structural member to an annular flange at an axial end of the second structural member. Multiple bolts around the circumference of the flanges connect the two structural members together.

This type of connection, although common, has several drawbacks. First, the flanges on both of the structural members increase the weight of the overall assembly. Further, the assembly of the numerous bolts through the flanges is time consuming. Similarly, if the structural members ever need to be serviced, removal and re-assembly of the structural members is again time consuming. Additionally, if these structural members are part of an aerodynamic housing, such as a housing for an engine on an aircraft, the flanges interfere with airflow over the housing. This not only reduces the aerodynamics of the housing but produces unequal cooling patterns on the outer surface of the housing. In particular, the area behind the flanges will not have as much airflow and will therefore have less cooling.

SUMMARY OF THE INVENTION

A coupling according to the present invention provides a flush outer surface, reduced weight and easier assembly. A first structural member has a plurality of first interlocking members extending radially outward from an outer circumferential surface of its axial end. A second structural member has a plurality of second interlocking members extending radially inward from an inner circumferential surface of its axial end.

The axial end of the first member is insertable into the axial end of the second structural member, such that the first interlocking members are inserted between and then past the second interlocking members. The first structural member and second structural member are then rotated relative to one another to a locked angular orientation in which the first interlocking members are interlocked behind the second interlocking members (and vice versa) to prevent relative axial movement of the first and second structural members. Keys are then inserted into the first and second structural members to prevent relative rotation, thus maintaining the first interlocking members in the interlocked position with the second interlocking members. In one preferred embodiment of the present invention, the first interlocking members and the second interlocking members are portions of L-shaped protrusions.

BRIEF DESCRIPTION OF THE DRAWINGS

Other advantages of the present invention can be understood by reference to the following detailed description when considered in connection with the accompanying drawings wherein:

FIG. 3 illustrates a portion of the assembled coupling of FIG. 1, showing the interlocking members in phantom.

FIG. 4 is an enlarged side view of a portion of the structural members of FIG. 1 in a disassembled state.

FIG. 5 is a sectional view taken along line 5—5 of FIG. 4.

FIG. 6 illustrates the structural members of FIG. 4 partially inserted within one another.

FIG. 7 illustrates the structural members of FIG. 4 fully inserted within one another.

FIGS. 12A and 12B illustrate portions of complementary axial ends of first and second structural members, respectively, according to a third embodiment of the present invention.

FIG. 12C is a sectional view through the axial ends of the first and second structural members of FIGS. 12A and 12B in a disassembled state.

FIGS. 13A and 13B illustrate portions of complementary axial ends of first and second structural members, respectively, according to a fourth embodiment of the present invention.

DETAILED DESCRIPTION OF THE PREFERRED EMBODIMENTS

Figure 1:
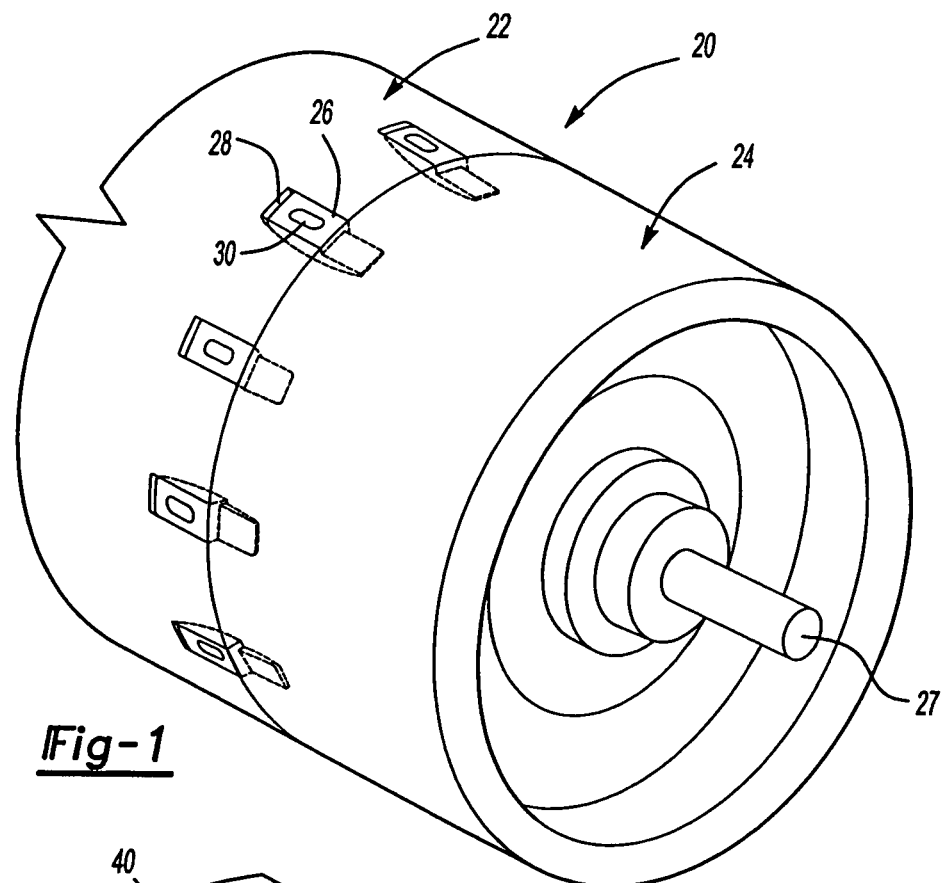
FIG. 1 is a perspective view of the coupling of the present invention assembled as a housing for a engine.

FIG. 1 is a perspective view showing the coupling 20 of the present invention for use as a housing for an engine 27, such as a turbine engine 27. The coupling 20 includes a first structural member 22 and second structural member 24. In this example, the first and second structural members 22, 24 are shown as cylindrical halves of the housing for purposes of illustration; however, the invention is not limited to cylindrical members, but could also be used for conical members or other members with circular cross-sections. Keys 26 inserted into keyway 28 prevent relative rotation of the first and second structural members 22, 24. The keys 26 may each include an aperture 30 to assist in removal with a tool from the first and second structural members 22, 24.

Figure 2A:
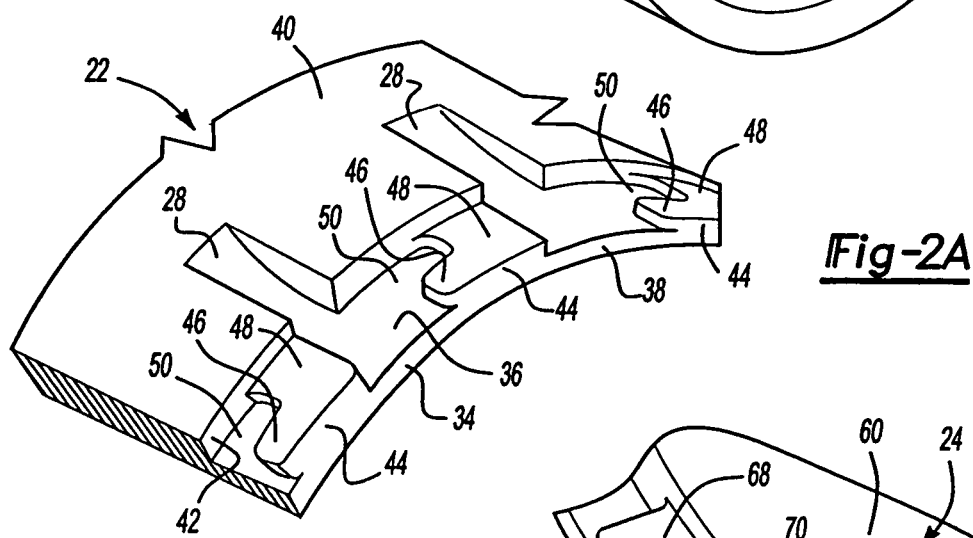
FIG. 2A is an enlarged view of a portion of the first structural member of FIG. 1.

FIG. 2A illustrates a portion of a mating axial end 34 of the first structural member 22. The mating axial end 34 of the first structural member 22 includes an outer circumferential surface 36 adjacent an annular axial surface 38. The outer circumferential surface 36 of the mating axial end 34 has an outer diameter less than that of an outer surface 40 of the body of the first structural member 22, thus forming an annular shoulder 42 about the circumference of the first structural member 22.

The outer circumferential surface 36 of the first structural member 22 includes a plurality of circumferentially spaced protrusions 44, which in this example, are L-shaped protrusions 44, each having an interlocking member 46 and a stop member 48. The interlocking member 46 is spaced axially away from the shoulder 42 to form a recess 50 between the interlocking member 46 and the shoulder 42 and adjacent the stop member 48. The keyway 28 is defined from the outer surface 40 of the first structural member 22 through the outer circumferential surface 36 adjacent the L-shaped protrusion 44. In general, the annular axial surface 38 may be equal or approximately equal to half the thickness of the shoulder 42, and may equal or approximate the thickness of the L-shaped protrusion 44, such that the annular axial surface 38 and the L-shaped protrusions each form approximately ⅓ of the thickness of the first structural member 22.

Figure 2B:
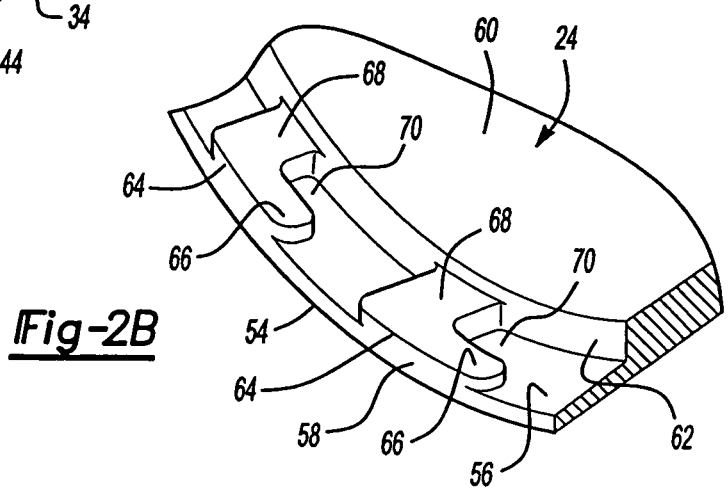
FIG. 2B is an enlarged view of the second structural member of FIG. 1.

FIG. 2B illustrates a portion of the mating axial end 54 of the second structural member 24. The mating axial end 54 of the second structural member 24 includes an inner circumferential surface 56 adjacent an annular axial surface 58. The inner circumferential surface 56 has an inner diameter that is greater than an inner diameter of an inner surface 60 of the body of the second structural member 24, thereby forming an annular shoulder 62 about the circumference of the second structural member 24.

The inner circumferential surface 56 of the mating axial end 54 of the second structural member 24 includes a plurality of circumferentially spaced protrusions 64, which in this example are L-shaped protrusions 64 comprising an interlocking member 66 and a stop member 68. The interlocking member 66 is spaced axially outwardly from the annular shoulder 62, thereby forming a recess 70 adjacent the stop member 68. In general, the annular axial surface 58 may equal or approximate the thickness of the L-shaped protrusions 64, which in turn may equal or approximate half the thickness of the annular shoulder 62.

FIG. 3 is a perspective view showing the first structural member 22 and the second structural member 24 in the locked angular orientation, such that the interlocking members 46 of the first structural member 22 are interlocked with the interlocking members 66 of the second structural member 24 to prevent relative axial movement of the first and second structural members 22, 24. In this position, the interlocking members 46 of the first structural member 22 are disposed within the recesses 70 of the second structural member 24, while the interlocking members 66 of the second structural member are disposed within the recesses 50 of the first structural member 22. The keys 26 are then inserted into the keyways 28 to prevent relative rotation between the first and second structural members 22, 24, thereby maintaining the interlocking members 46, 66 interlocked with one another.

FIG. 4 is a side view showing a first step in coupling the first and second structural members 22, 24. FIG. 5 is a sectional view through line 5—5 of FIG. 4. Referring to FIGS. 4 and 5 for explanation of the first step in assembly, the axial ends 34, 54 are generally aligned, while the first and second structural members 22, 24 are rotated slightly relative to one another in order to align the L-shaped protrusions 64 on the inner circumference 56 of the second structural member between the L-shaped protrusions 44 on the outer circumferential surface 36 of the first structural member 22.

In a second step, as shown in FIG. 6, the mating axial end 34 of the first structural member 22 is inserted into the mating axial end 54 of the second structural member 24, such that the L-shaped protrusions 64 on the second structural member are inserted between and past the L-shaped protrusions 44 on the first structural member 22.

As shown in FIG. 7, in a third step, the axial end 34 of the first structural member 22 is inserted into the axial end 54 of the second structural member 24 until the L-shaped protrusions 64 of the second structural member abut the annular shoulder 42 on the first structural member 22. At the same time, the L-shaped protrusions 44 on the first structural member 22 abut the annular shoulder 62 on the second structural member 24.

Figure 8:
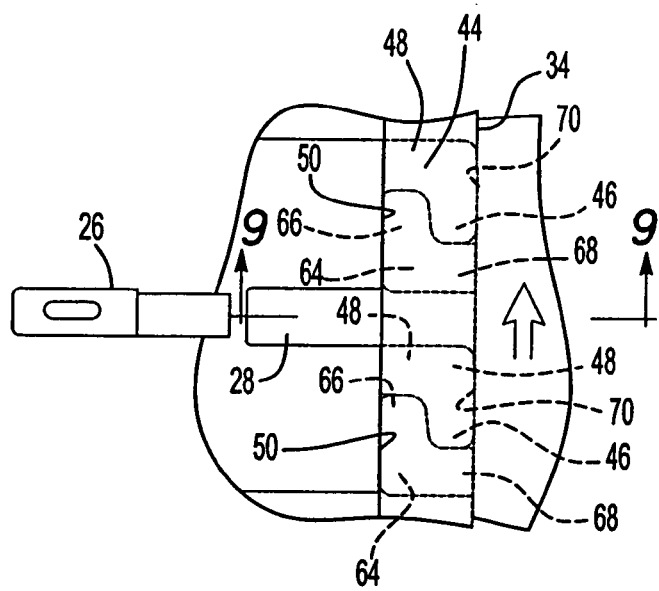
FIG. 8 illustrates the structural members of FIG. 4 in a locked angular orientation relative to one another.
Figure 10:
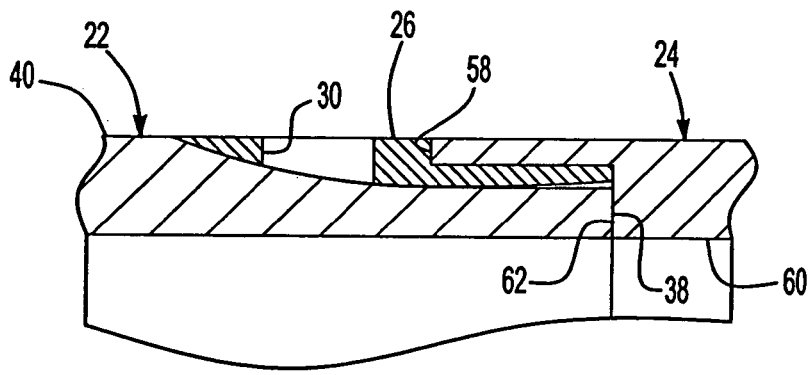
FIG. 10 shows the structural members of FIG. 9 with the key in the locked position.

In a fourth step shown in FIG. 8, the first and second structural members 22, 24 are rotated slightly relative to one another to a locked angular orientation in which the interlocking members 46, 66 are interlocked. In the locked angular orientation, each interlocking member 46 of the first structural member 22 is disposed behind one of the interlocking members 66 in one of the recesses 70 of the second structural member 24. Each interlocking member 66 of the second structural member 24 is disposed behind one of the interlocking members 46 in one of the recesses 50 of the first structural member 22. Relative rotation of the first and second structural members 22, 24 is limited by the contact of the interlocking member 46 of the first structural member 22 with the stop member 68 of the second structural member 24 and by the contact of the interlocking member 66 of the second structural member 24 with the stop member 48 of the first structural member 22. In this locked angular orientation, the first and second structural members 22, 24 are locked axially relative to one another. The interlocking members 46, 66 may be slightly tapered to provide a tight interference fit, also drawing the annular axial surface 38 of the first structural member 22 against the annular shoulder 62 of the second structural member 24 to provide a fluid tight seal (FIG. 10).

Figure 9:
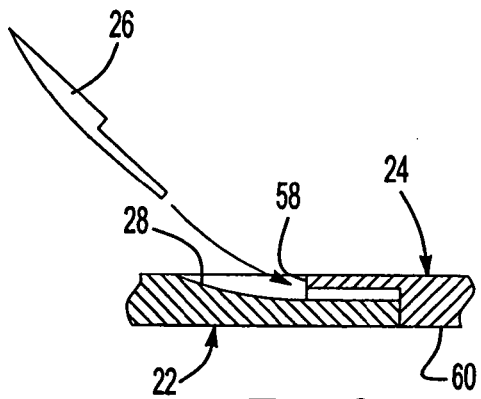
FIG. 9 is a sectional view taken along line 9—9 of FIG. 8.

While the first and second structural members 22, 24 are in the locked angular orientation, the keys 26 are inserted into the keyways 28 in the first structural member 22 as shown in FIGS. 8 and 9. In the keyway 28, each key 26 is positioned between a stop member 48 of the first structural member 22 and a stop member 68 on the second structural member 24, thus preventing the relative rotation of the first and second structural members 22, 24 out of the locked angular orientation.

Disassembly of the first and second structural members 22, 24 is accomplished by first removing the keys 26, optionally by the use of a tool inserted into the aperture 30. The first and second structural members 22, 24 are then rotated relative to one another out of the locked angular orientation in order to align the interlocking members 66 between the interlocking members 46. The mating axial end 34 of the first structural member 22 can then be removed from the mating axial end 54 of the second structural member 24.

Figure 11:
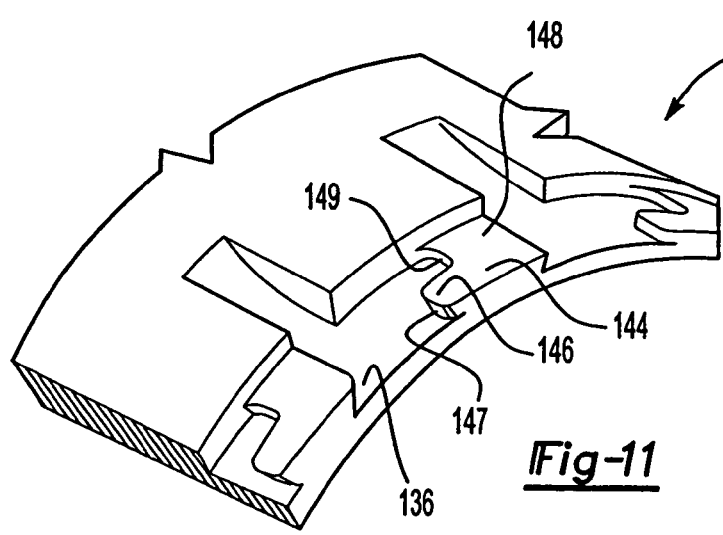
FIG. 11 is a perspective view of a portion of a second embodiment of a first structural member according to the present invention.
Figure 11A:
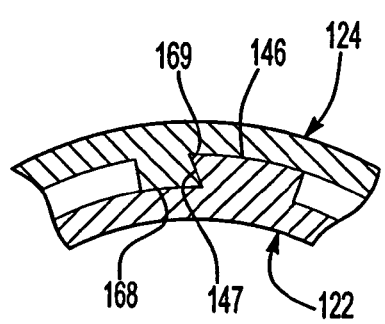
FIG. 11A is a sectional view through the second embodiment of the first and second structural members.

FIG. 11 illustrates a portion of an alternate first structural member 122 having circumferentially-spaced L-shaped protrusions 144 from an outer circumferential surface 136. Throughout the description of the second embodiment, reference numerals for elements that correspond to elements in the first embodiment are simply preappended by the numeral "1." Each of the L-shaped protrusions 144 includes an undercut leading edge 147 on the interlocking member 146 and an undercut leading edge 149 on the stop member 149. FIG. 11A is a sectional view through a portion of alternative first and second structural members 122, 124 in the locked angular orientation. The second structural member 124 includes an undercut leading edge 169 on the stop member 168 complementary to the undercut leading edge 147 on the interlocking member 146 on the first structural member 122. The second structural member 124 would also include a similarly undercut leading edge (not shown) on its interlocking member (not shown) complementary to the leading edge 149 of the stop member 148. The complementary undercut leading edges on the L-shaped protrusions increase the strength of the connection between the first and second structural members 122, 124 in the radial direction.

FIGS. 12A–C illustrate first and second structural members 222, 224 according to a third embodiment of the present invention. Throughout the description of the third embodiment, reference numerals of elements that correspond to elements in the first embodiment are simply preappended by the numeral "2." Referring to FIGS. 12A and 12C, the first structural member 222 includes a plurality of dovetailed protrusions 244 which are also the interlocking members 246. Each interlocking member 246 includes four dovetail undercuts 247, 251. The annular shoulder 242 also includes a dovetail undercut 243. Additionally, the keyways 228 also include undercuts 229 complementary to the keys (not shown). Referring to FIGS. 12B and 12C, the second structural member 224 includes a plurality of dovetailed protrusions 264 which are also the interlocking members 266. Each interlocking member 266 includes four dovetailed undercuts 267, 271. The annular shoulder 262 includes a dovetail undercut 263.

Referring to FIG. 12C, the undercuts 251 on the interlocking member 246 are complementary to the undercut 263 on the annular shoulder 262 of the second structural member and to the undercut 271 opposite the annular shoulder 262. Similarly, the undercuts 271 on the interlocking member 266 are complementary to the undercut 243 on the annular shoulder 242 of the second structural member and to the undercut 251 opposite the annular shoulder 242. The assembly and disassembly process is similar to that described above with respect to the first embodiment, with the exception that there are no stop members, although stop members could optionally be added to this embodiment as well.

A fourth embodiment is shown in FIGS. 13A and 13B. Throughout the description of the fourth embodiment, reference numerals of elements that correspond to elements in the first embodiment are simply preappended by the numeral "3." Referring to FIG. 13A, the first structural member 322 includes a plurality of circumferentially-spaced groups of axially-spaced, circumferentially-elongated interlocking members 346 protruding radially outward from the outer circumferential surface 336. The interlocking members 346 are spaced axially outward of the annular shoulder 342. Similarly, as shown in FIG. 13B, the second structural member 324 includes a plurality of circumferentially-spaced groups of axially-spaced, circumferentially-elongated interlocking members 366 protruding radially inward from the inner circumferential surface 356. The interlocking members 366 are spaced axially outward of the annular shoulder 362. Assembly and disassembly of the fourth embodiment is similar to that described above with respect to the first embodiment. The interlocking members 346 of the first structural member 322 interlock with the interlocking members 366 of the second structural member 324 thereby locking the two structural members 322, 324 axially together with a fluid tight seal. Keys (not shown) are then inserted into the keyways 328 to prevent relative rotation of the first and second structural members 322, 324. Again, stop members could optionally be provided to limit relative rotation during assembly.

Figure 14:
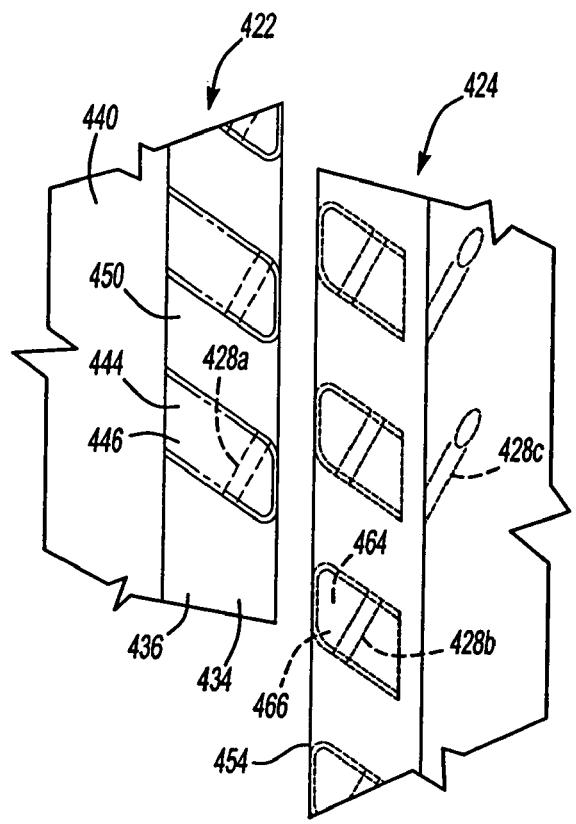
FIG. 14 illustrates a side view showing portions of the mating axial ends of structural members according to a fifth embodiment of the present invention shown in the disassembled state.
Figure 15:
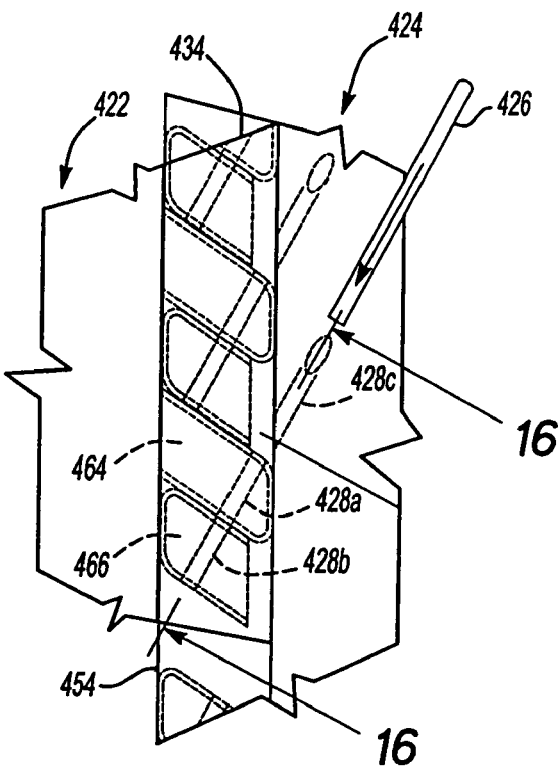
FIG. 15 illustrates the structural members of FIG. 14 in the locked angular orientation.
Figure 16:
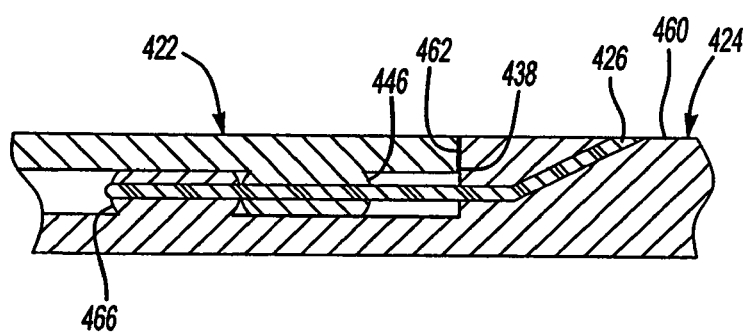
FIG. 16 illustrates a sectional view taken along line 16—16 of FIG. 15, with the key inserted into the keyway.

A fifth embodiment is shown in FIGS. 14–16. Throughout the description of the fifth embodiment, reference numerals of elements that correspond to elements in the first embodiment are simply preappended by the numeral "4." As shown in FIG. 14, the first structural member 422 includes a plurality of circumferentially-spaced interlocking members 446 protruding radially outward from an outer circumferential surface 436. The interlocking members 446 preferably extend at an acute angle, more preferably approximately 45 degrees and most preferably 45 degrees, relative to an axis of the first structural member 422. The interlocking members 446, 466 may also be crowned longitudinally (i.e. generally perpendicular to keyways 428a, b), such that each interlocking member 446, 466 is thickest and highest at a midpoint along its longitudinal axis. A keyway 428a extends through each interlocking member 446 generally perpendicular to the interlocking member 446 as shown. The second structural member 424 also includes a plurality of circumferentially-spaced interlocking members 466 protruding radially inward from an inner circumferential surface. The interlocking members 466 preferably extend at an acute angle, more preferably approximately 45 degrees and most preferably 45 degrees, relative to an axis of the second structural member 424. A keyway 428b extends generally perpendicularly through each interlocking member 466 as shown. A keyway 428c extends from an outer surface of the second structural member 424 and is aligned with the keyway 428b.

For assembly, the axial end 434 of the first structural member 422 is inserted into the axial end 454 of the second structural member 424 and rotated slightly to the locked angular orientation such that the interlocking members 446, 466 interlock with one another as shown in FIG. 15. Each key 426 is then inserted into the aligned keyways 428a, b, c to rotationally lock the first and second structural members 422, 424 to one another in the locked angular orientation. As can be seen in FIG. 16, the annular axial surface 438 of the first structural member abuts and forms a fluid tight seal against the annular shoulder 462 of the second structural member 424.

In any of the above embodiments, the keys 26, 126, 226, 326, 426 could be snap-fit into their keyways 28, 128, 228, 328, 428 to assist in retaining the keys in the keyways. Alternatively, adhesive, fasteners and/or an interference fit could also be used to retain the keys in keyways. In any of the above embodiments, it is anticipated that the interlocking members 46, 66, 146, 166, 246, 266, 346, 366, 446, 466 would have a sloped interface in order to draw the first and second members toward one another, thereby preloading the interface between the first and second members. This not only provides a fluid tight seal, but also maintains the seal under load during use. Additionally, a gasket could be added between the mating surfaces in any of the above embodiments to further improve the seal between the first and second members.

It is anticipated that for applications where tolerances are more important that the first and second members would be machined. A right angle head spindle may be necessary for machining the inner diameter of the second members 24, 124, 224, 324, 424.

For any of the above embodiments, it may be desirable to precisely position only a subset (e.g. three or four) of the stop members 48, 68, 148, 168, 248, 268, 348, 368, 448, 468 and to remove (or move out of the way) the remaining stop members. In this manner, better tolerances on the angular orientation between the first and second structural members may be achieved more easily.

Optionally, for the first four embodiments, the outer surface 40, 140, 240, 340 of the first member 22, 122, 222, 322 could include an annular groove about its circumference that aligns with a similar groove across the keys 26, 126, 226, 326. A band or wire could then be secured around the first member within the annular groove to retain the keys in their keyways. The first and second members of any of the above embodiments can be any material, including polymers, composites or metals, and may be cast, molded or machined, depending upon the particular application. Tolerances and other manufacturing details would depend upon the particular application and could be determined by one of skill in the art.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers for steps in the method claims are for ease of reference by dependent claims, and do not indicate a required sequence, unless otherwise indicated.

What is claimed is:

1. A coupling comprising:
a first member having an axial end with an outer circumferential surface having an outer first diameter, a first interlocking member extending radially outward from the outer circumferential surface, the first member including a body portion axially spaced from the first interlocking member, the body portion having an outer diameter greater than the outer first diameter of the outer circumferential surface, wherein the first interlocking member is a portion of an L-shaped protrusion from the outer circumferential surface;
a second member having an axial end with an inner circumferential surface having an inner second diameter, a second interlocking member extending radially inward from the inner circumferential surface, wherein the second interlocking member is a portion of an L-shaped protrusion from the inner circumferential surface;
at least one of the first and second members including a keyway;
the outer circumferential surface insertable into the inner circumferential surface such that the first interlocking member is inserted past the second interlocking member, the first member and second member then being rotatable relative to one another to a locked angular orientation in which the first interlocking member is interlocked with the second interlocking member to prevent relative axial movement of the first member relative and the second member, a key being insertable into the keyway when the first and second members are in the locked angular orientation to prevent rotation of the first member and second member relative to one another.

2. The coupling of claim 1 wherein the first interlocking member is one of a plurality of first interlocking members positioned radially outward from the outer circumferential surface of the first member and wherein the second interlocking member is one of a plurality of second interlocking members positioned radially inward from the inner circumferential surface of the second member.

3. The coupling of claim 2 wherein the at least one of the first and second members includes a plurality of the keyways into which a plurality of keys are insertable to prevent relative rotation of the first member and second member.

4. The coupling of claim 2 wherein the plurality of first interlocking members are circumferentially distributed along the outer circumferential surface and the plurality of second interlocking members are circumferentially distributed along the inner circumferential surface.

5. The coupling of claim 2 wherein the plurality of first interlocking members are axially spaced from one another on the outer circumferential surface and the plurality of second interlocking members are axially spaced from one another on the inner circumferential surface.

6. The coupling of claim 1 wherein the keyway is defined adjacent to and abuts at least one of the first interlocking member and the second interlocking member to prevent relative rotation of the first and second members.

7. The coupling of claim 1 wherein the outer diameter of the body portion of the first member is substantially equal to and substantially aligned with an outer circumferential surface of the axial end of the second member.

8. The coupling of claim 1 wherein the axial end of the first member includes an axially outer annular surface and wherein the second member includes an annular shoulder surface axially inward of the second interlocking member, the outer annular surface of the first member abutting and forming a gas-tight seal against the annular shoulder surface of the second member when the first and second members are in the locked angular orientation.

9. The coupling of claim 1 wherein at least one of the first member and the second member further includes a stop member adjacent the interlocking member, the stop member abutting the interlocking member on the other of the first member and the second member to limit relative rotation between the first member and the second member.

10. The coupling of claim 1 wherein a radially outer surface of the first interlocking member abuts the inner circumferential surface of the second member in the locked angular orientation.

11. The coupling of claim 10 wherein the first interlocking member includes an undercut complementary to an undercut of the L-shaped protrusion from the inner circumferential surface.

12. The coupling of claim 1 wherein the key is insertable at least partially between the outer circumferential surface and the inner circumferential surface.

13. A coupling comprising:
a first member having an axial end with an outer circumferential surface having an outer first diameter less than an outer diameter of a body portion circumferential surface of the first member adjacent the outer circumferential surface, a first interlocking member extending radially outward from the outer circumferential surface and axially spaced from the body portion circumferential surface;
a second member having an axial end with an inner circumferential surface having an inner second diameter greater than an inner diameter of the second member adjacent the inner circumferential surface, a second interlocking member extending radially inward from the inner circumferential surface, at least one of the first member and the second member further including a stop member adjacent the interlocking member;
at least one of the first and second members including a keyway; and the outer circumferential surface insertable into the inner circumferential surface such that the first interlocking member is inserted past the second interlocking member, the first member and second member then being rotatable relative to one another to a locked angular orientation in which the first interlocking member is interlocked with the second interlocking member to prevent relative axial movement of the first member relative and the second member, the stop member abutting the interlocking member on the other of the first member and the second member to limit relative rotation between the first member and the second member, a key being insertable into the keyway when the first and second members are in the locked angular orientation to prevent rotation of the first member and second member relative to one another.

14. The coupling of claim 13 wherein a radially outer surface of the first interlocking member abuts the inner circumferential surface of the second member in the locked angular orientation.

15. The coupling of claim 14 wherein the key is insertable at least partially between the outer circumferential surface and the inner circumferential surface.

16. A method for connecting a first member to a second member including the steps of:

a) aligning radially outwardly extending first interlocking members on an outer circumference of an axial end of a first member between radially inwardly extending second interlocking members on an inner circumference of an axial end of a second member;

b) inserting the axial end of the first member into the axial end of the second member;

c) imparting relative rotation between the first member and second member until the first and second members are in a locked orientation in which the first interlocking members are interlocked with the second interlocking members and until at least one of the first interlocking members or the second interlocking members contacts a stop member adjacent at least one of the other of the first interlocking members or the second interlocking members to limit relative rotation of the first member and the second member; and d) after said step c), inserting at least one key into an outer surface of one of the first member and the second member and adjacent a portion of each of the first and second members to selectively prevent relative rotation between the first and second members, such that the at least one key is substantially flush with an adjacent outer surface of the first member that is axially spaced from the second member.

* * * * *